United States Patent
Mathur

(10) Patent No.: US 10,956,419 B2
(45) Date of Patent: Mar. 23, 2021

(54) ENHANCED SEARCH FUNCTIONS AGAINST CUSTOM INDEXES

(71) Applicant: Salesforce.com, Inc., San Francisco, CA (US)

(72) Inventor: Rohitashva Mathur, Walnut Creek, CA (US)

(73) Assignee: Salesforce.com, Inc., San Francisco, CA (US)

( * ) Notice: Subject to any disclaimer, the term of this patent is extended or adjusted under 35 U.S.C. 154(b) by 170 days.

(21) Appl. No.: 16/374,640

(22) Filed: Apr. 3, 2019

(65) Prior Publication Data

US 2020/0320079 A1 Oct. 8, 2020

(51) Int. Cl.
*G06F 16/2453* (2019.01)
*G06F 16/22* (2019.01)
*G06F 16/2455* (2019.01)

(52) U.S. Cl.
CPC .... *G06F 16/24545* (2019.01); *G06F 16/2291* (2019.01); *G06F 16/24537* (2019.01); *G06F 16/24553* (2019.01)

(58) Field of Classification Search
CPC .......... G06F 16/2291; G06F 16/2425; G06F 16/24534; G06F 16/24537; G06F 16/24545; G06F 16/24547; G06F 16/2455; G06F 16/24553; G06F 16/2468
See application file for complete search history.

(56) References Cited

U.S. PATENT DOCUMENTS

| | | | |
|---|---|---|---|
| 2004/0044791 A1* | 3/2004 | Pouzzner | G06F 40/12 709/245 |
| 2007/0288230 A1* | 12/2007 | Datta | G06F 40/263 704/9 |
| 2008/0065607 A1* | 3/2008 | Weber | G06F 16/313 |
| 2008/0263066 A1* | 10/2008 | Tsuhako | G06F 16/3338 |
| 2009/0171936 A1* | 7/2009 | Kirk | G06F 16/24553 |
| 2012/0179703 A1* | 7/2012 | Ajitomi | G06F 16/24 707/765 |

(Continued)

FOREIGN PATENT DOCUMENTS

WO 2018075839 A1 4/2018

OTHER PUBLICATIONS

Udemy Editor. 'Search Your Database with the Contains SQL Function'. Udemy. Jun. 2014 [retrieved on Nov. 17, 2020], Retrieved from the Internet <URL: https://blog.udemy.com/sql-contains/> (Year: 2014).*

*Primary Examiner* — James E Richardson
(74) *Attorney, Agent, or Firm* — Kwan & Olynick LLP

(57) ABSTRACT

A database query may be determined based on a database query definition. The database query definition may include a filter criterion that contains a wildcard match, which may include a first fixed portion and a second wildcard portion. The first fixed portion may include one or more combining characters. The database query may include a first query portion including a first canonical representation of the first fixed portion that omits the one or more characters. The database query may include a second query portion including a second canonical representation of the first fixed portion. The database query may be executed to select a result set that includes a plurality of query result values by applying the second query portion to filter values accessed by the first query portion.

20 Claims, 9 Drawing Sheets

(56) References Cited

U.S. PATENT DOCUMENTS

| | | | |
|---|---|---|---|
| 2014/0317087 A1* | 10/2014 | Collins | G06F 16/2255 |
| | | | 707/715 |
| 2016/0217192 A1* | 7/2016 | Hota | G06F 16/219 |
| 2018/0025174 A1 | 1/2018 | Mathur et al. | |
| 2018/0107697 A1 | 4/2018 | Tariq et al. | |
| 2018/0107711 A1 | 4/2018 | Tariq et al. | |
| 2018/0107714 A1 | 4/2018 | Tariq et al. | |
| 2018/0114033 A1 | 4/2018 | Mathur | |
| 2018/0129691 A1 | 5/2018 | Mathur | |
| 2018/0150533 A1 | 5/2018 | Mathur | |
| 2020/0183934 A1* | 6/2020 | Mathur | G06F 16/24542 |

* cited by examiner

ENHANCED SEARCH FUNCTIONS AGAINST CUSTOM INDEXES

FIELD OF TECHNOLOGY

This patent document relates generally to database systems and more specifically to searching records within database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of system provided via a cloud computing framework is a database system. A database system stores potentially many database records in a tabularized format. These records may then be searched via database queries. Each database query may specify one or more criteria for identifying records, and the execution of the database query may return some number of the database records.

BRIEF DESCRIPTION OF THE DRAWINGS

The included drawings are for illustrative purposes and serve only to provide examples of possible structures and operations for the disclosed inventive systems, apparatus, methods and computer program products for enhanced search functions against custom indexes. These drawings in no way limit any changes in form and detail that may be made by one skilled in the art without departing from the spirit and scope of the disclosed implementations.

DETAILED DESCRIPTION

Figure 1:
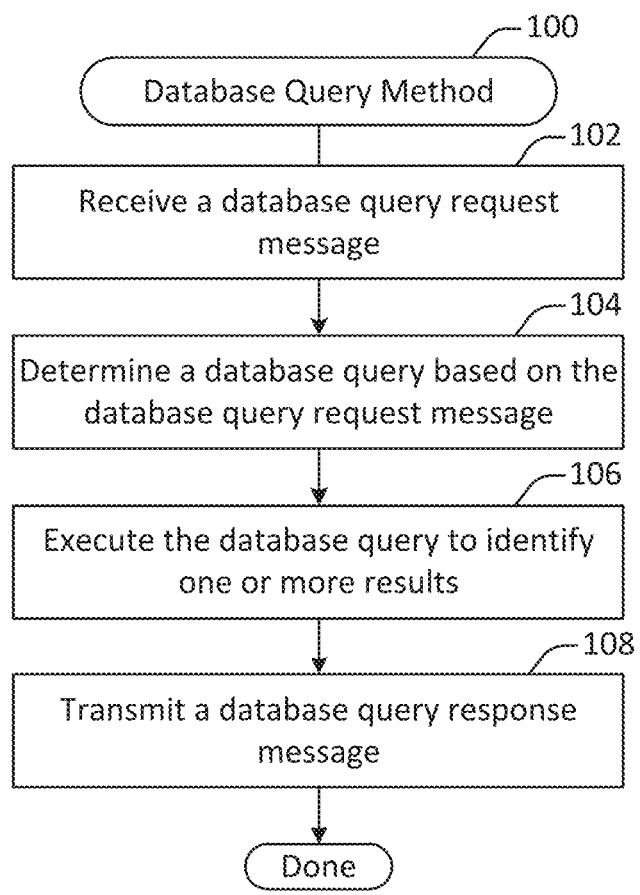
FIG. 1 illustrates an example of a database query method, performed in accordance with one or more embodiments.

According to various embodiments, a database system may store potentially many different database rows, or records, in potentially many different database tables. Indexing is a way to improve performance of a certain class database queries by reducing the number of disk accesses required when a query is processed. An index or database index is a data structure which is used to quickly locate and access the data in a database table. An index may be implemented as a database column. For instance, an index may be implemented by using a sorted ordering of the values in the column or by applying a hash function to a value.

In some embodiments, a database system may be implemented to include custom indexing. A custom index may be similar in many ways to a standard index, except that the custom index is maintained by an application as typed values in another table on which standard indexes exist. The value corresponding to base table value that is stored in this other table (referred to herein as a custom index table) is an encoded form of the base table value. For example, a database may be used to store information associated with a variety of applications, and different applications may supply one or more custom indices to use on data associated with the application.

In some implementations, custom-indexing may be used to support a multi-tenant architecture. In a multi-tenant database, data associated with different organizations is stored in the same database table. In such a configuration, a custom index may be specific to an organization.

In some implementations, custom-indexing may be used to support a dynamic-schema architecture. In a dynamic-schema database, data associated with different object definitions is stored in the same database table. In such a configuration, a custom index may be specific to an object definition. In particular embodiments, a database system may be both multi-tenant and dynamic-schema.

In conventional systems, the execution of some types of database queries can require substantial computational resources. According to various embodiments, techniques and mechanisms described herein may be used to generate and execute such database queries more quickly and/or efficiently. Accordingly, techniques and mechanisms described herein may provide for substantial improvements to the functioning of a computing system that includes a database system. For example, a user seeking to query a complex distributed database using a query that includes one or more wildcard criteria may receive a result much more quickly when querying a database implemented using techniques and mechanisms described herein than when querying a database implemented using conventional techniques.

In some embodiments, techniques and mechanisms described herein may be used to query against custom indexes when using wildcard query portion. A wildcard query portion is any query criterion that matches a portion of a string to a field value in a database. For example, a wildcard query portion may include a LIKE or CONTAINS criterion.

According to various embodiments, a LIKE query portion is a criterion of the form "filter LIKE 'header %'", where the start of the filter is fully specified (i.e. the fixed string "header"), and the end of the filter is left open (i.e. "%"). For instance, a LIKE query portion such as "name LIKE Alex %" would match all records in which the name fields starts with the four letters "Alex". Such a query allows for accessing the underlying B-Tree efficiently if there aren't too many values that have the same header.

According to various embodiments, a CONTAINS query portion is a criterion of the form "filter LIKE '% part %'", where the neither the start or the end of the filter is fully specified, but rather only what the indexed data value contains. For instance, a CONTAINS query portion such as "name LIKE '% alex %'" would match all records in which the name field includes the four letters "alex." In such a query, the whole index may be scanned to find matching values.

According to various embodiments, text may be encoded in any of various ways. For example, text may be encoded in an encoding format such as Unicode (e.g., UTF-8, UTF-16, UTF-32), ISO 8859 (e.g., ISO 8859-1, ISO 8859-2, etc.), or EBCDIC (e.g., CP3, CP930, CP1047). Within a particular encoding format, text may be stored in a normalized form to facilitate comparison between strings. For example, Unicode includes normalization forms such as Normalization Form D (NFD), Normalization Form C (NFC), Normalization Form KD (NFKD), and Normalization Form KC (NFKC).

In some implementations, canonical forms may be used to normalize combining characters and precomposed character. A combining character is a character that modifies one or more other characters. For example, diacritical marks (e.g., circumflex, acute accent, grave accent, etc.) that are added to a letter are often represented as combining characters. In some character encodings such as Unicode, a modified character may be represented in more than one way. For example, é (U+00E9) is a precomposed character that can be decomposed into an equivalent string of the base letter e (U+0065) and combining acute accent (U+0301).

In some implementations, a canonical form may be used to provide a standardized encoding of a text string. By applying a normalization algorithm such as the Unicode Normalization Algorithm, all precomposed characters and combining characters may be represented in a standardized format and in a specified order. After normalization, two strings that encoded the same information in different ways would be equivalent.

According to various embodiments, techniques and mechanisms described herein may be used to replace a filter criterion having a wildcard with a less restrictive filter used to access a custom index. The query may then be executed in two stages: a first stage in which the custom index table is accessed using the less-restrictive filter and a second stage in which the accessed rows are filtered to identify the query results. For example, a first filter to access the custom index may eliminate from a fixed string portion of a filter criterion any trailing combining characters, if any, and then one additional trailing character (which is not a combining character). The second filter may retain the original set of characters in the fixed string portion. Both stages may be transformed to a canonical representation.

In a database, where SQL may be used, different methods apply to predicate ("WHERE") clauses. An access predicate expresses the start and stop conditions of the leaf node traversal. An index filter predicate, or filter for index operations, are applied during leaf node traversal only and do not contribute to the start and stop conditions and do not narrow the scanned range. A table level filter predicate, or filter for table operations, is a predicate on columns. Table level predicates on columns that are not part of the index. Table level predicates are evaluated at the table level such that the database loads the row from the table first. Because custom indexes operate outside a native database, a multitenant architecture generates its own filters for the custom indexes. The first filter generated is used to access the custom index, meaning that the first filter expresses the start and stop conditions of the leaf node traversal, or query. The second filter generated includes a second like filter to filter the values obtained from this access. A function that converts a string value to the NFKD value may be performed on the custom indexed column to filter the obtained values on the original value in the custom index column value.

FIG. 1 illustrates an example of a database query method 100, performed in accordance with one or more embodiments. In some implementations, the method 100 may be performed on one or more components of a computing services environment.

A database query request message is received at 102. In some embodiments, the database query request message may be received via a communication interface. For instance, the database query request message may be received at a database systems communication interface configured to expose an API for accessing information stored in the database.

In some implementations, the database query request message may specify one or more criteria for accessing database records. For example, the database query request message may indicate a type or types of object to retrieve. The database query request message may also include information such as characteristics of column values associated with the objects. For example, the database query request message may ask to retrieve all "User" objects having a value for the "age" field of 25-35. As another example, the database query request message may ask to retrieve all "Contact" objects having an email address field that contains the string "@gmail.com" and having a name that starts with "René".

According to various embodiments, the database query request message may be provided in any suitable format. For example, in the Salesforce.com on-demand computing environment, the database query request message may include one or more Salesforce Object Query Language (SOQL) commands. Alternately, or additionally, the database query request message may include commands in any other suitable query language. Such query languages may include, but are not limited to: Structured Query Language (SQL), Java Persistence Query Language (JPQL), Contextual Query Language (CQL), Object Query Language (OQL), and Facebook Query Language (FQL).

According to various embodiments, the database query request message may be generated by an application. For instance, an application executed in an on-demand computing services environment may transmit a database query request message to retrieve data to support the execution of the application. Alternately, the database query request message may be generated by a user. For instance, a user may specify one or more criteria for selecting database records to retrieve.

At 104, a database query is determined based on the database query request message. In some implementations, the database query may be determined by translating the query request message from the language in which it is specified to a different language that is executable by the database. For example, a query may be translated from SOQL to SQL.

In some embodiments, determining the database query may involve one or more operations for modifying a wildcard query portion to employ a custom database index. Techniques for determining a database query are described in additional detail throughout the application, including for example with reference to FIGS. 4, 5, and 6.

At 106, the database query is executed to identify one or more results. According to various embodiments, the database query results may include any or all database records that match the criteria specified in the database query request message. As is discussed herein, the execution of the query may involve the application of a query filter, in which a first query portion is used to access a set of database records via a custom index and a second query portion is used to filter those records.

A database query response message is transmitted at 108. According to various embodiments, the message may be transmitted via any suitable communications interface. The message may include one or more of the results identified at operation 106. Alternately, or additionally, the message may include information about the execution of the query, such as an indication that the query is complete or a location at which the query results are stored.

Figure 2:
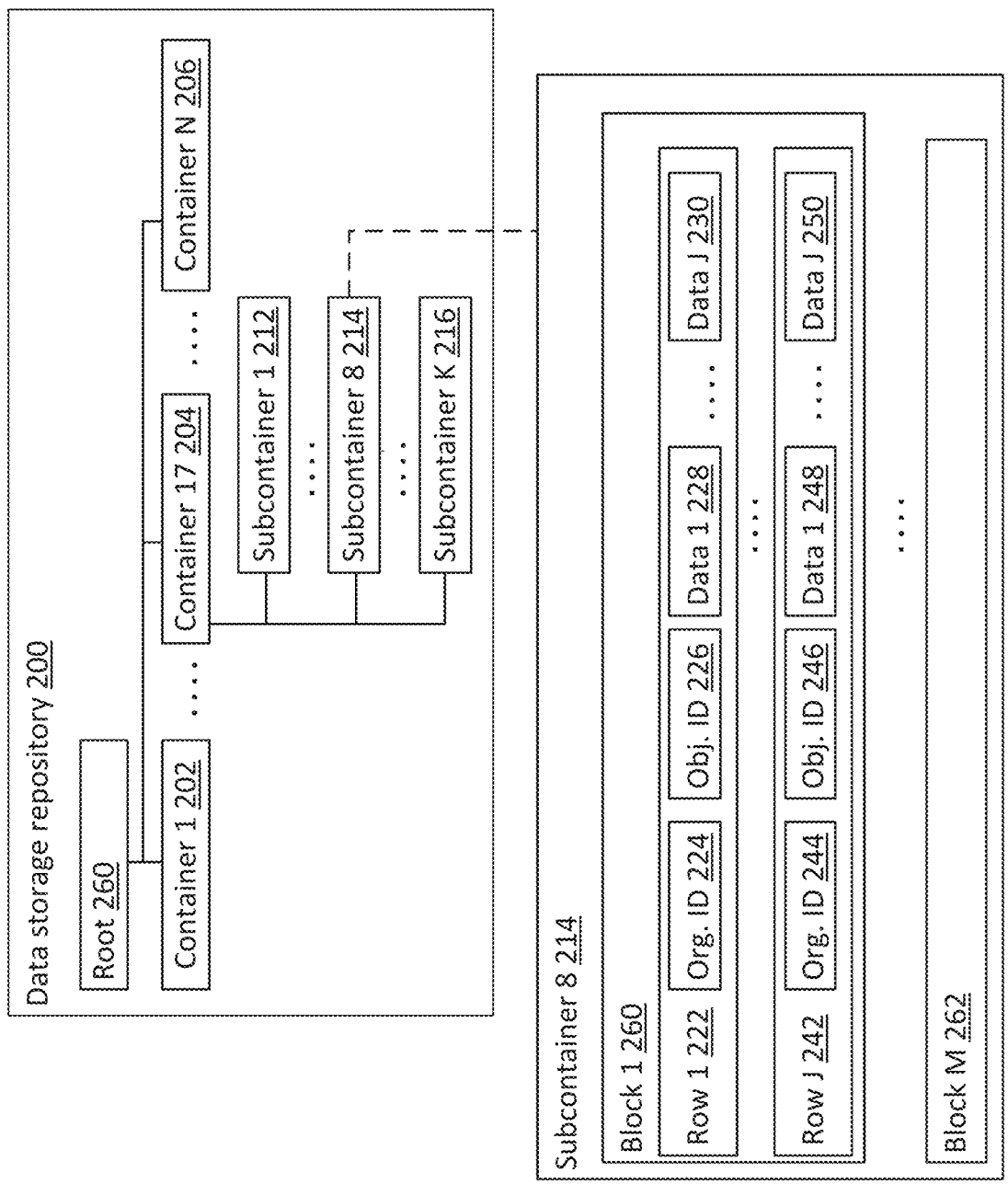
FIG. 2 illustrates an example of a data storage repository, configured in accordance with one or more embodiments.

FIG. 2 illustrates a data storage repository 200, configured in accordance with one or more embodiments. According to various embodiments, the data storage repository may be implemented at least in part via an on-demand database accessible via an on-demand computing services environment, such as the environment discussed with respect to FIGS. 8-10.

According to various embodiments, a data storage repository may include one or more database tables. For example, the data storage repository 200 may include one or more tables arranged according to a multi-tenant and/or dynamic-schema configuration. As another example, the data storage repository 200 may include one or more tables arranged according to a configuration that is not multi-tenant or that reflects a fixed database schema.

The data storage repository 200 includes a root node 260. According to various embodiments, the root node 260 corresponds to a database table. The root node 260 serves as an addressable location for storing data to the database table and retrieving data from the database table.

In some implementations, a root node may include a number of partitions, which are referred to herein as containers. For example, the root node 260 includes the containers 202-206, including the container 17 204. Each container may include one or more subcontainers. For example, the container 17 204 includes the subcontainers 212-216, including the subcontainer 8 214.

The example configuration shown in FIG. 2 includes a hierarchy with two levels: containers and subcontainers. However, various types of configurations are possible. According to various embodiments, a database may include one, two, three, or any suitable finite number of levels in a partition hierarchy. Further, although the hierarchy shown in FIG. 2 refers to containers and subcontainers for the purpose of illustration, this naming convention may reflect a logical convention rather than a physical difference. Accordingly, the term "container" is used herein to refer to a partition at any level of a hierarchy.

In some implementations, a container may correspond with a logical grouping of data. For example, a container may be specific to an organization. As another example, a container may be specific to a database object. As yet another example, a container may be specific to an organization and a database object. As still another example, a container may be specific to an organization, a database object, and one or more properties of the database objects.

In some embodiments, each container may include one or more data blocks. For example, the subcontainer 8 214 includes the data blocks 260-262. In some embodiments, each block may correspond to a specific portion of storage on a storage device such as a hard drive. For example, a block may include 8 kilobytes of storage space. However, depending on the system configuration, a block may include any suitable amount of storage space.

In some embodiments, a block may correspond to the smallest addressable unit of storage on a hard drive for the purpose of reading and riding data. For example, many storage disks specify a unit of size between 2 kilobytes and 64 kilobytes as the minimum addressable unit. In such configurations, the entire block would be read as a unit, even if only a portion of the block were needed to respond to a query. Similarly, the entire block would be written as a unit, even if only a portion of the block needed to be updated. Accordingly, aggregating database entries that are commonly read or written together may provide a substantial performance increase in comparison to a fragmented system in which a block stores unrelated data.

According to various embodiments, each block may include one or more rows, with each row corresponding to a database entry. For instance, if a database stores information associated with a customer relations management (CRM) system, a given database entry may be associated with a customer of an organization, a contact at such a customer, or a sale made to such a customer. In FIG. 2, the block 1 260 in the subcontainer 8 214 includes the rows 222-242.

According to various embodiments, each row may include an organization identifier. For example, the rows 222 and 242 include the organization identifiers 224 and 244. Each organization identifier identifies the organization that owns the data stored in the corresponding row. For example, an organization identifier may correspond with a tenant in a multi-tenant database.

In particular embodiments, techniques and mechanisms described herein may be applied to databases or database tables that are not organizes in a multi-tenant configuration. In a single-tenant configuration, a database row may not include an organization identifier.

In some implementations, each row may include an object identifier. For example, the rows 222 and 242 include the object identifiers 226 and 246. Each object identifier identifies the object definition associated with the database row. For example, one row of a database may correspond with a customer of an organization, while another row of a database may correspond with a contact person at that customer. In this example, the two rows would have different object identifier values that identified the definition of a customer object and a contact object respectively.

In some embodiments, each row may include a number of data fields. For example, the rows 22 and 242 include the data fields 228-230 and 248-250 respectively. Each data field may store a data value for the database entry represented by the row. For example, if a database row corresponds with a customer of an organization, data fields within that row may store information such as the customer name, customer address, customer phone number, date in which the customer was added to the database, and other such customer-level information.

In some implementations, such as dynamic-schema database configurations, the same data field may store different types of information in different rows. For example, if the row 1 222 corresponds with a customer of an organization, the data field 1 228 may store the customer name. In this example, if the row J 242 corresponds with a contact person at that customer, then the data field 1 248 may correspond with the phone number of the contact person.

According to various embodiments, in dynamic-schema database configurations, the information stored in a particular data field may be defined according to one or more metadata entries. Techniques and mechanisms associated with metadata entries that support dynamic-schema database configurations are discussed throughout the application, and more specifically with respect to FIG. 3.

In particular embodiments, not all data values need to be filled for each database entry. For example, a database table may be configured with a fixed number of fields, such as 100 or 1,000. However, an individual database entry may be associated with an object definition that only employs 50 data fields. For such a database entry, only 50 data fields may be filled even though the row includes space for more.

FIG. 2 represents a simplified example of a data storage repository. For instance, in FIG. 2, only two rows and two blocks are shown. However, database tables often contain many database entries divided among many database rows. For example, a database table may store thousands, millions, billions, or trillions of rows divided among similarly large numbers of data blocks. As another example, a database table may include any suitable finite number of containers and subcontainers.

Figure 3:
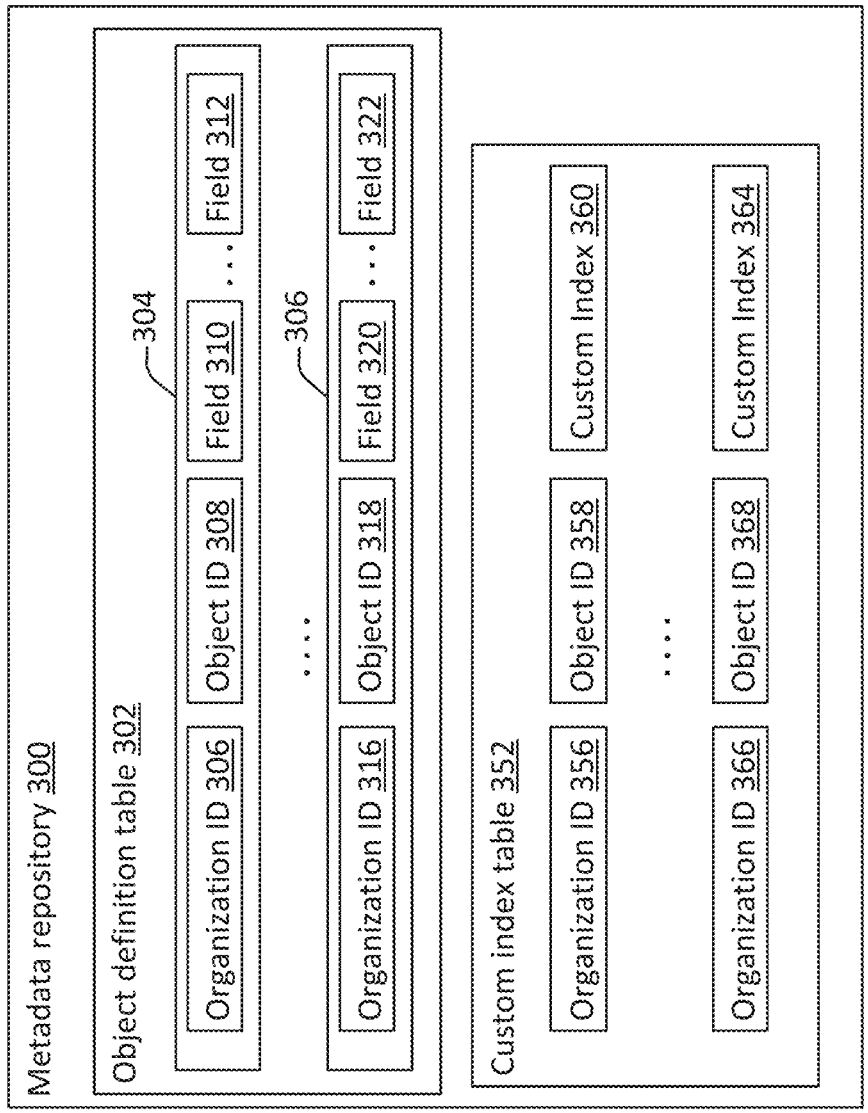
FIG. 3 illustrates an example of a metadata repository, configured in accordance with one or more embodiments.

FIG. 3 illustrates an example of a metadata repository 300, configured in accordance with one or more embodiments. According to various embodiments, the data storage repository may be implemented at least in part via an on-demand database accessible via an on-demand computing services environment, such as the environment discussed with respect to FIGS. 7-9.

The metadata repository 300 includes an object definition table 302. The object definition table 302 stores object definitions for dynamic-schema database objects that may be stored within a database table. The object definition table 302 includes the object definitions 304-306. Each object definition entry includes an object identifier that identifies the object defined by the object definition. For example, the object definitions 304 and 306 include the object identifiers 308 and 318.

According to various embodiments, in a multi-tenant configuration an object definition entry may include an organization identifier. For example, the object definitions 304 and 306 include the organization identifiers 306 and 316. The presence of an organization identifier may allow for the creation of organization-specific object definitions. For example, a standard customer object may include a designated set of fields. However, different organizations may wish to expand the standard customer object to include additional, organization-specific fields.

In some implementations, an object definition entry may include one or more field data definitions. For example, the object definitions 304 and 306 include the field data definitions 310-312 and 320-22. Each field definition may identify the information included in a designated data field in a database entry corresponding to the identified object. For example, if the object definition entry 304 corresponds to a custom definition of a customer object, then the field 310 may indicate that the data J 230 field in Row 1 222 in FIG. 2 stores an organization-specific customer type field for the customer. In this example, the field is specific to the organization associated with the organization ID 306.

In particular embodiments, each object definition entry may include all field data definitions for a given object and organization. Alternately, each object definition entry may include a single field definition for a given object and organization, with each object and organization having a separate field object definition entry for each field.

According to various embodiments, the tables included in the metadata repository 300 are configured to facilitate the management of one or more multi-tenant, dynamic-schema database tables such as the table discussed with respect to FIG. 2. In some implementations, a metadata repository 300 may include additional tables not shown in FIG. 3, or may include tables arranged in a different configuration than that shown.

In some implementations, database tables or metadata tables such as those shown in FIGS. 2 and 3 may include elements that are not depicted in those figures. For example, database tables commonly include index values to facilitate more efficient storage and retrieval and/or queries such as join operations.

The metadata repository 300 includes a custom index table 352. According to various embodiments, the custom index table 352 includes entries for different organizations and objects. For example, the custom index table 352 includes entries for organization ID 356 and object ID 358 through organization ID 366 and object ID 368. These identifiers correspond to those in the object definition table 302. In addition, each entry in the custom index table 352 includes a custom index such as the custom indices 360 and 364.

According to various embodiments, the custom indices may be defined on the application level. For example, an application associated with a particular organization may define a custom index for a particular type of object associated with that organization. Accordingly, the custom indices may differ from native database indices maintained by the underlying database implementation.

In a multi-tenant and/or dynamic-schema database, different fields may represent different types of information for different objects. Accordingly, a native database index may not provide the same efficiency gains in such a database as compared to a conventional database configuration. However, the custom index may be used in a similar manner to facilitate efficient querying. For example, one of the fields for an object in the object definition table 302 may store a custom index. In this way, the custom index table may be used to querying objects using the custom index, and then joined to the object data table configured as described in FIG. 2 to retrieve the object data.

Figure 4:
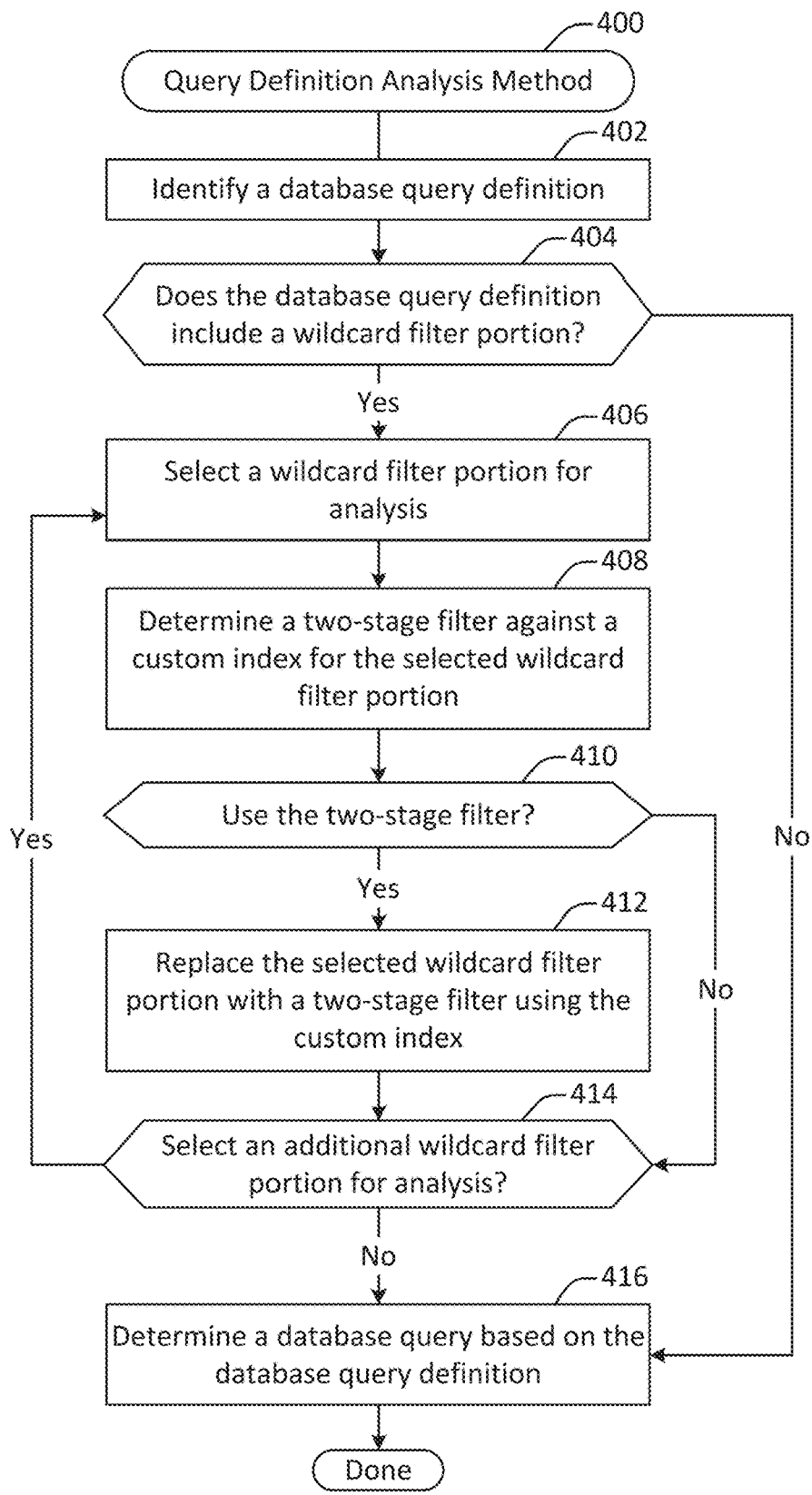
FIG. 4 illustrates an example of a method for analyzing a query definition, performed in accordance with one or more embodiments.

FIG. 4 illustrates an example of a method 400 for analyzing a query definition, performed in accordance with one or more embodiments. In some instances, the method 400 may be performed as part of a database query method, such as the query method 100 discussed with respect to FIG. 1. Alternately, the method 400 may be performed independently of such a method, for instance to determine a query based on a database query definition included in computer programming language code.

A database query definition is identified at 402. According to various embodiments, the database query definition may include one or more criteria for identifying records in a database. As discussed with respect to the method 100, a database query definition may be specified in any suitable language. For instance, the database query definition may be specified in SOQL or another object query language.

At 404, a determination is made as to whether the database query definition includes a wildcard filter portion. In some embodiments, the determination may be made at least in part by evaluating each logical portion of the database query definition to determine whether the portion is a wildcard filter portion. For instance, the database query definition may include one or more different criteria that are combined via conjunction, disjunction, subquery, or other operators to form a logical description of records to retrieve.

According to various embodiments, a wildcard filter portion includes any query match criterion in which a string is partially matched. For example, a wildcard filter portion may include a LIKE criterion. As another example, a wildcard filter portion may include a CONTAINS criterion. As yet another example, a wildcard filter portion may include any suitable type of regular expression. For instance, a wildcard filter portion may include a criterion specifying that a string field ends with a designated sequence of 5 characters.

If the database query definition includes at least one wildcard filter portion, then at 406 a wildcard filter portion is selected for analysis. According to various embodiments, the wildcard filter portions that are identified may be analyzed in any suitable order. For example, the wildcard filter portions may be analyzed in sequence or in parallel.

A two-stage filter against a custom index is determined for the selected filter at 408. According to various embodiments, determining a two-stage filter may involve one or more operations for generating a first query portion to access a set of values based on a custom index and a second query portion that filters the values. For example, the first query portion may include a subset of the characters in the fixed string portion of a wildcard match, while the second query portion may include all of the characters in the fixed string portion of the wildcard match. In each query portion, the fixed string component may be normalized to produce a canonical form of the fixed string. Techniques for generating such a two-stage filter are discussed in additional detail elsewhere herein, for instance with respect to the method 500 shown in FIG. 5.

A determination is made at 410 as to whether to use the two-stage filter. According to various embodiments, the first stage of the two-stage filter may be generated so as to query against a custom index, providing for potentially more efficient execution than scanning all field values. However, as discussed with respect to the method 500 in FIG. 5, the first stage may also access a number of records greater than that specified by the selected wildcard filter portion. If the first stage of the two-stage filter accesses an excessive number of records, then the two-stage filter may be deemed not usable.

In some embodiments, a wildcard filter portion specifying the retrieval of all records where for example "name LIKE '% é %'" may be converted to a two-stage filter in which the first stage matches all records where "name LIKE '%'". In this example, the first stage of the two-stage filter would not be imposing any constraint or the content of the name field (i.e. it would be matching all names). Accordingly, the two-stage filter may be deemed not usable.

In some embodiments, a wildcard filter portion specifying the retrieval of all records where for example "name LIKE 'Ré %'" may be converted to a two-stage filter in which the first stage matches all records where "name LIKE 'R %'". In this example, the first stage of the two-stage filter would only be imposing the constraint that the name field start with R. The database system may apply one or more heuristics or rules to determine that such a narrow constraint is likely to access too many records to provide for an efficient query. In such a situation, the database system may deem the two-stage filter not usable.

In some embodiments, heuristics for determining whether to use a two-stage filter may be determined automatically. For example, the database system may observe the execution of database queries over time and use efficiency statistics for such queries to determine whether to use a two-stage filter in a subsequent query.

In some embodiments, rules for determining whether to use a two-stage filter may be determined based on user input. For instance, a database administrator may specify one or more rules that indicate when a two-stage filter should not be used. For example, one such rule may specify a minimum length of a fixed string portion in the first stage of a two-stage filter. Such a minimum length may be specified as a constant (e.g., one, two, or five characters), Alternately, or additionally, a minimum length may be specified in relation to the selected wildcard filter portion (e.g., a reduction in character count of no more than two, five, or eight characters).

In particular embodiments, a two-stage filter may not be used initially but indicated as usable as a last resort. For example, the first-stage of a two-stage filter may reduce the fixed string portion to a single character and be indicated as not to be used in the final query. However, if the final query fails or otherwise is excessively inefficient, the two-stage filter may nevertheless be used as a last resort.

If the two-stage filter is used, then at 412 the selected wildcard filter portion is replaced with a two-stage filter using the custom index. The two-stage filter may be replaced so that when a database query is determined at 416, the two-stage filter is used instead of the wildcard filter portion selected at 406 that was initially present in the database query definition identified at 402.

At 414, a determination is made as to whether to select an additional wildcard filter portion for analysis. As discussed with respect to operation 406, wildcard filter portions may be analyzed in any suitable order.

A database query based on the database query definition is determined at 416. Techniques for constructing a database query based on a database query definition are described in further detail elsewhere herein, such as with respect to the method 600 shown in FIG. 6.

Figure 5:
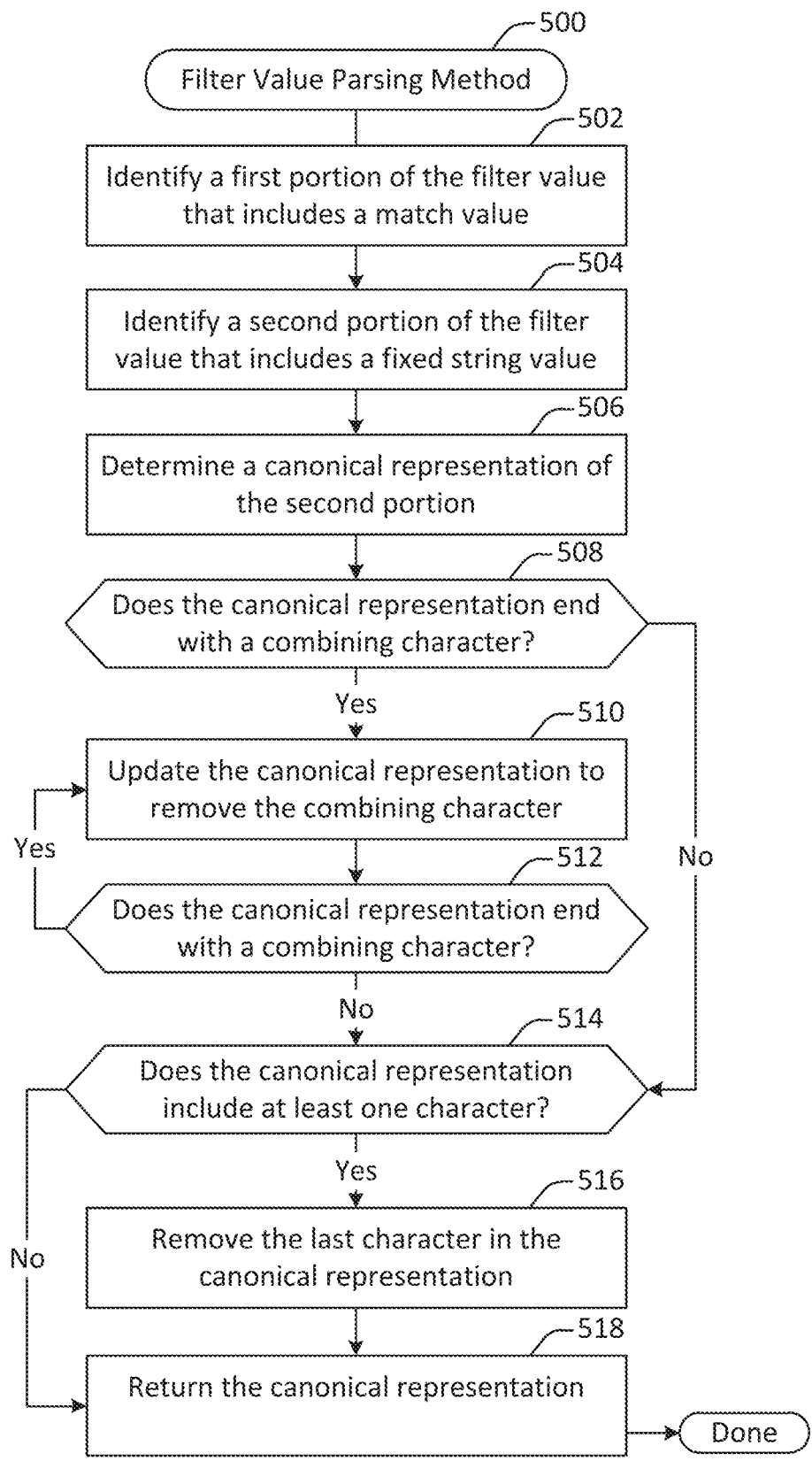
FIG. 5 illustrates a method for parsing a filter value, performed in accordance with one or more embodiments.

FIG. 5 illustrates a method 500 for parsing a filter value, performed in accordance with one or more embodiments. According to various embodiments, the method 500 may be performed at one or more components in an on-demand computing services environment. The method 500 may be performed to determine a first portion of a two-stage filter for replacing a wildcard filter portion of a database query definition. For example, the method 500 may be performed at operation 408 shown in FIG. 4. Alternately, the method 500 may be performed independently of the method 400 shown in FIG. 4.

According to various embodiments, the method 500 may be performed to parse a particular portion of a database query definition. For example, the method 500 may be performed to parse a filter that includes a wildcard criterion such as a LIKE expression, a CONTAINS expression, or another type of regular expression.

A first portion of the filter value that includes a match value is identified at 502. According to various embodiments, the match value may include a wildcard expression such as "%". The match value may match any one or more characters. In some instances, more than one match value maybe determined. For example, a CONTAINS query such as "name LIKE '% alex %'" may include a fixed string value (i.e. "alex") in between a first match value (i.e. "%") and a second match value (i.e. "%"). The first portion of the filter value may be identified by searching the filter value for matching characters such as ('%').

According to various embodiments, the specific character or characters that are matching characters may depend on the query language definition. Thus, although "%" is used herein to designated a matching character, other languages may use different characters as a matching character.

A second portion of the filter value that includes a fixed string portion is identified at 504. In some embodiments, the fixed string portion may include any sequence of one or more characters that are not matching characters. For example, in a CONTAINS query such as "name LIKE '% René%'", the fixed string portion is "René".

A canonical representation of the second portion is determined at 506. In some embodiments, the canonical representation may be the NFKD Unicode normalization form. Alternately, a different canonical representation may be used. The canonical representation may be determined by applying a normalization algorithm to the raw string value. For NKFD, the normalization algorithm may first apply compatibility decomposition and then apply canonical composition.

At 508, a determination is made as to whether the canonical representation ends with a combining character. As discussed herein, a combining character is any character that modifies another character. For instance, a combining character may be a diacritical mark such as an accent.

If the canonical representation ends with a combining character, then at 510 the canonical representation may be updated to remove the combining character. After the removal, updated canonical representation may then be checked again at 512 to determine whether the updated canonical representation ends with a combining character.

When it is determined that the canonical representation does not end with a combining character, then at 514 a determination is made as to whether the canonical representation includes at least one character. If the canonical representation is not empty after the removal of the trailing combining characters, then at 516 the last character in the canonical representation is removed.

The canonical representation is returned at 518. According to various embodiments, the canonical representation may be returned to the method 400 for inclusion in the two-stage filter determined at 408. For example, the two-stage filter determined at 408 may include a first stage where the fixed portion of the wild-card filter portion is replaced with a canonical version from which any trailing combining marks and one additional character have been removed. The second stage in the two-stage filter may then include the wild-card portion with a full canonical representation of the fixed string portion with no characters removed. Accordingly, the first stage may be used to access records that mostly match the wildcard filter, while the second stage may be used to filter the accessed records to exclude those records that do not entirely match the wildcard filter.

Figure 6:
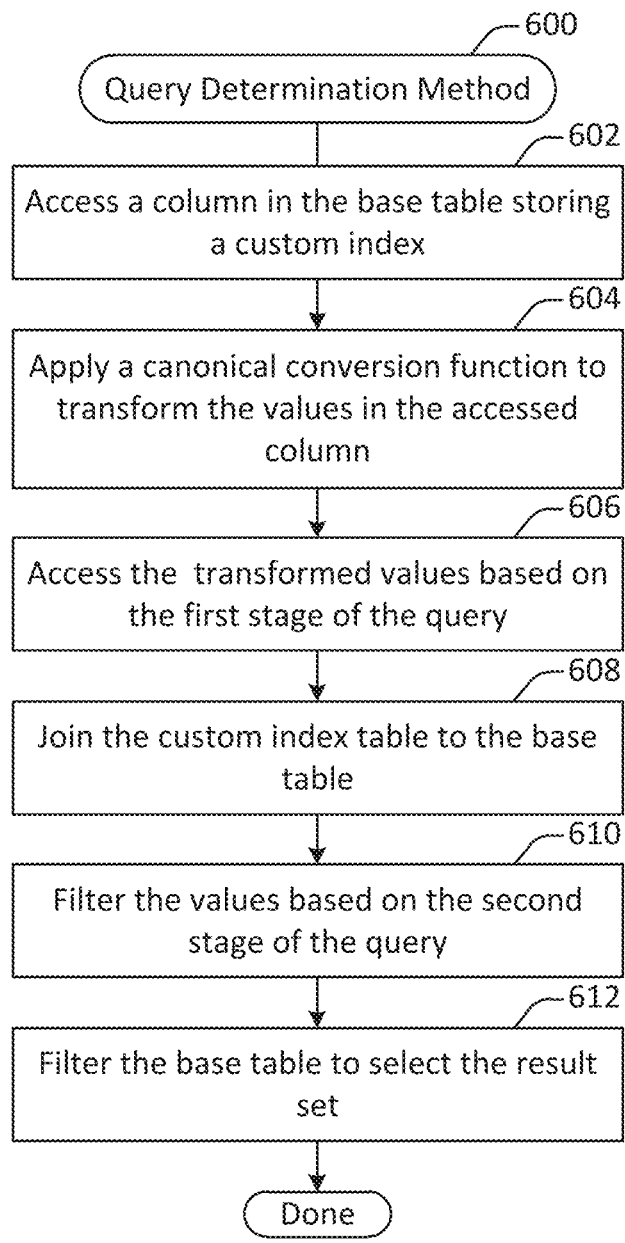
FIG. 6 illustrates an example of a method for determining a query, performed in accordance with one or more embodiments.

FIG. 6 illustrates an example of a method 600 for determining a query, performed in accordance with one or more embodiments. According to various embodiments, the method 600 may be used to construct a query portion that includes a two-stage filter. For example, the method 600 may use a two-stage filter constructed as discussed with respect to FIG. 5 to generate a database query portion executable by a database system.

In some implementations, the method 600 may be performed by one or more components in an on-demand computing services environment. For instance, the method 600 and/or other methods described herein may be performed by a query builder and/or query optimizer. Such components may be used to process a query definition to produce an executable database query.

A column in the base table storing a custom index is accessed 602. According to various embodiments, accessing the column may involve specifying a column identifier. In some implementations, accessing the column may involve specifying additional information, such as an organization identifier and/or object identifier associated with the custom index.

At 604, a canonical conversion function is applied to transform the values in the accessed column. According to various embodiments, the custom index may be stored in a first encoding format such as NFKC. The NFKC-encoded values may be transformed via a canonical conversion function to a different encoding format such as NFKD. In this way, the custom index values may be transformed to match the canonical encoding of the fixed string portion of the two-stage filter.

The transformed values are accessed at 606 based on the first stage of the query. In some implementations, accessing the transformed values may involve specifying the start and stop conditions of the leaf node traversal in the access predicate based on the first-stage filter. For example, the fixed string portion of the first-stage filter may be used to specify a range of custom index values to which the first-stage filter applies.

The custom index table is joined to the base table at 608. In some embodiments, joining the custom index table to the base table may involve specifying a join operation that includes information such as the identifiers that identify the base table and the join table as well as the custom index on which the join occurs.

The values are filtered based on the second stage of the query at 610. In some embodiments, filtering the values based on the second stage of the query may include specifying index filter predicates that are applied during the leaf node traversal only. Such index filter predicates may be specified based on the unaltered canonical representation of the fixed string portion of the wildcard criterion (i.e. without removing the combining characters).

At 612, the base table is filtered to select the result set. According to various embodiments, a query may include components other than a wildcard portion. Such components may include, for example, one or more filter criteria other than a wildcard filter. When such components are present, they may be included in the final database query along with the two-stage filter determined as discussed herein. For instance, one or more table-level filter predicates may be specified. Such predicates include those that are not part of the custom index.

In some implementations, one or more operations shown in FIG. 6 may be omitted. For example, the custom index may already be stored in the same canonical format as the fixed string portion of the first stage of the two-stage filter. In such a configuration, the operation 604 may be omitted.

According to various embodiments, one or more operations shown in FIG. 6, or in any other method described herein, may be performed in an order different than that shown. For example, the custom index table may be joined to the base table earlier in the procedure.

Figure 7:
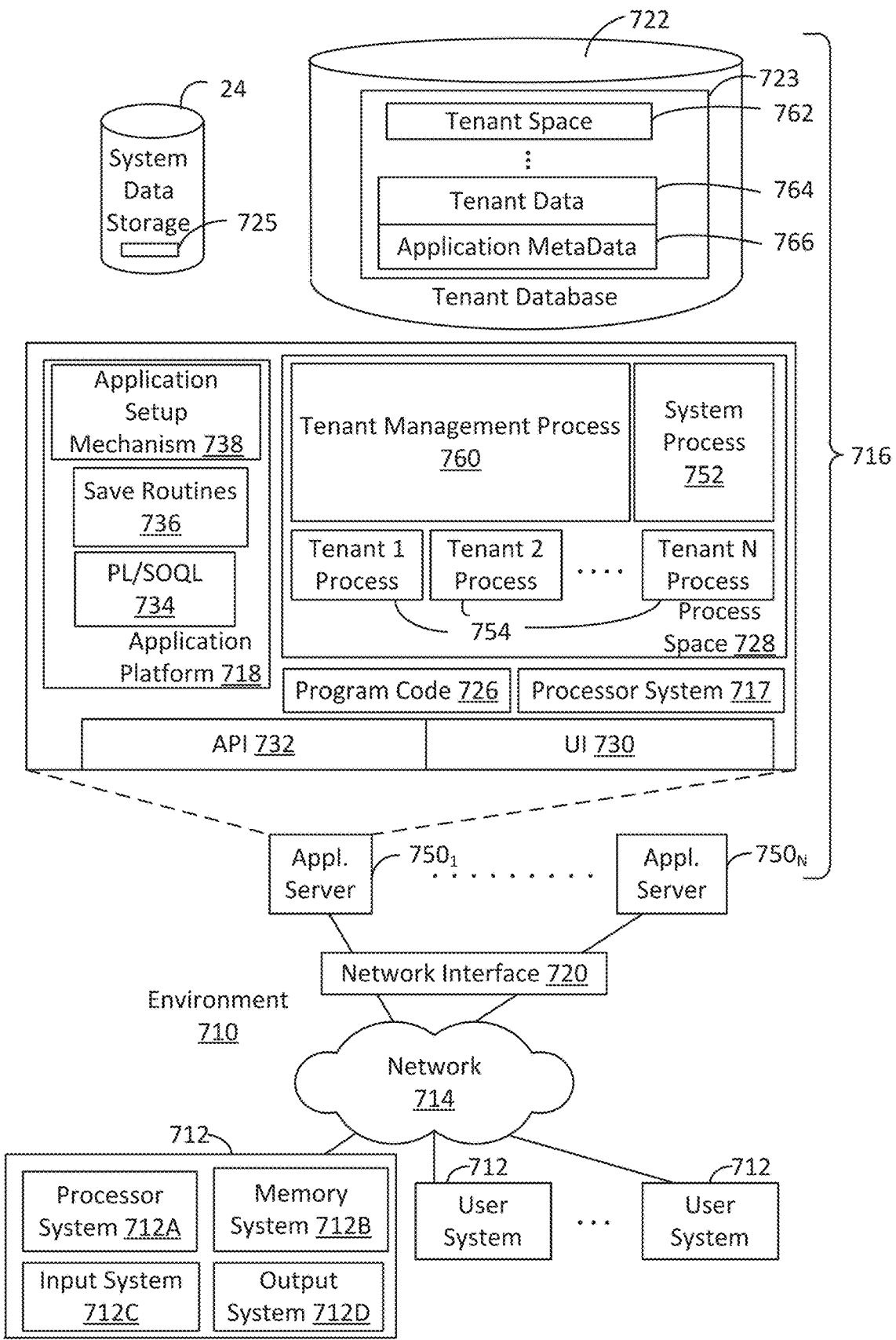
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based database front end system. For example, in some implementations, system 716 may include application servers configured to implement and execute database queries. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D, A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions.

However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MIS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MIS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc, Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
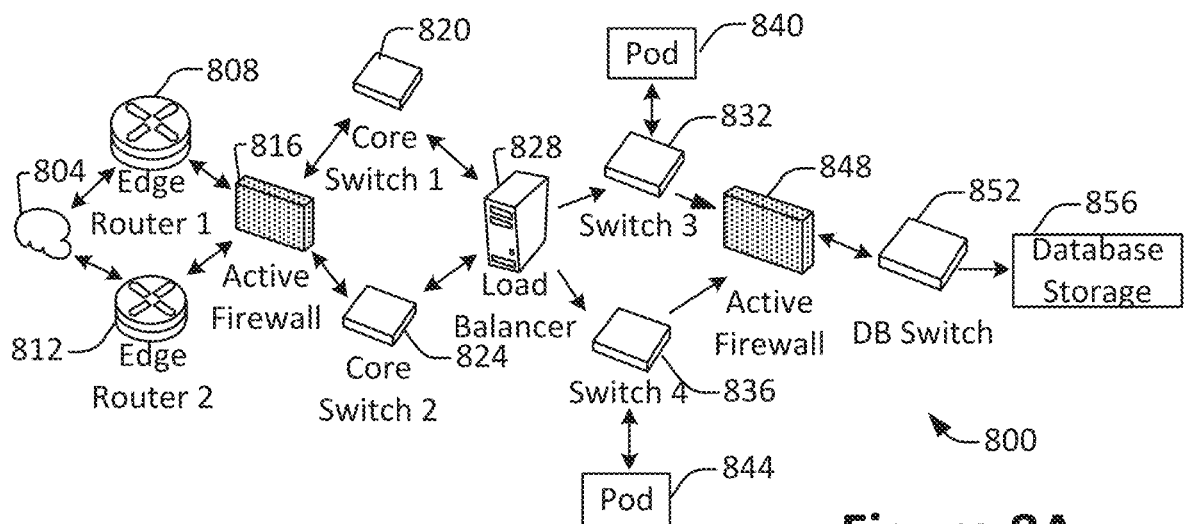
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812, A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process database query information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the Internet.

In one or more implementations, the firewall 816 may protect the inner components of the environment 800 from Internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800, The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
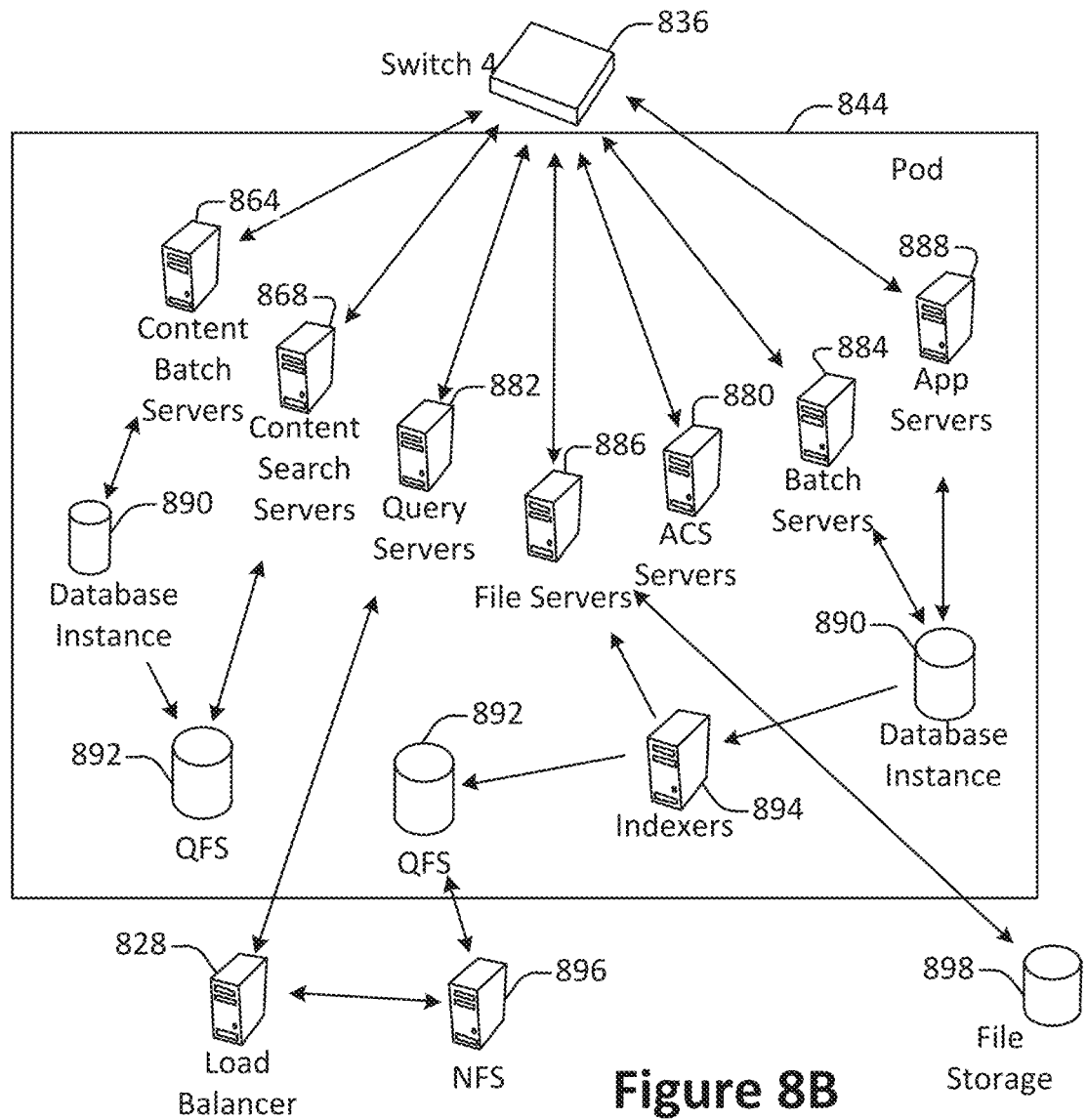
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MIS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBS), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
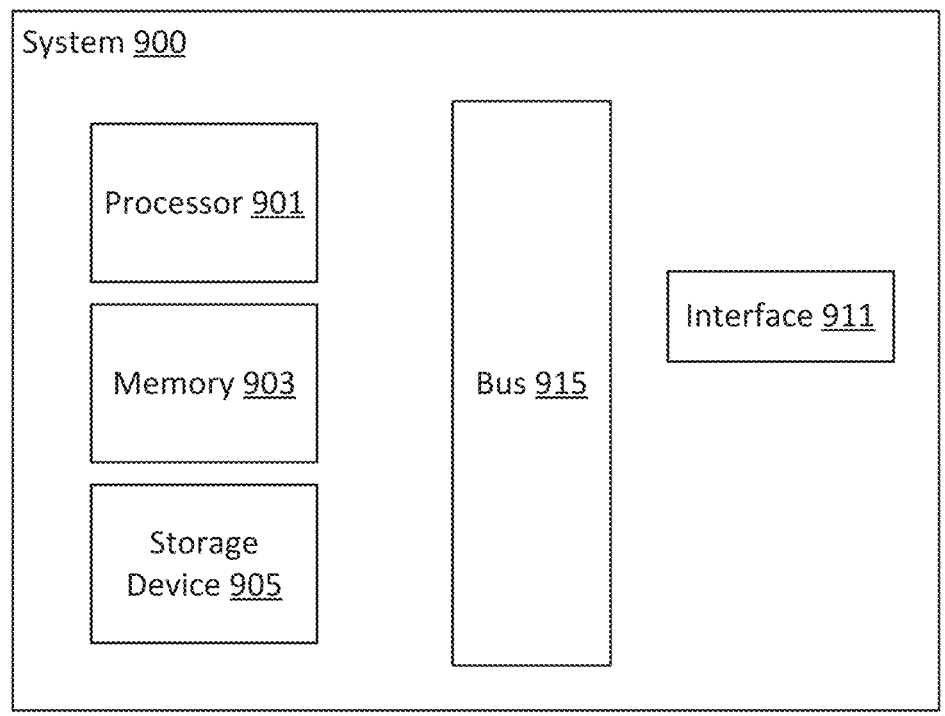
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents,

The invention claimed is:

1. A method comprising:
   determining a database query based on a database query definition via a processor, the database query including a first query portion and a second query portion, the database query definition including a designated filter criterion that contains a wildcard match, the wildcard match including a first fixed portion and a second wildcard portion, the first query portion including a first canonical representation of the first fixed portion that omits a first combining character, the second query portion including a second canonical representation of the first fixed portion that includes the omitted first combining character, the first combining character modifying a second non-combining character in the first fixed portion;
   executing the database query via a database system to select a result set that includes a plurality of query result values, the plurality of query result values selected by applying the second query portion to a base table column to filter values accessed by the first query portion against a corresponding custom index on the base table column, the custom index being maintained by an application external to the database system; and transmitting a response message via a network, the response message including the plurality of query result values.

2. The method recited in claim 1, wherein the wildcard match is a LIKE operator, and wherein the first fixed portion designates a beginning portion of a string, and wherein the second wildcard portion designates an ending portion of the string.

3. The method recited in claim 1, wherein the wildcard match is a CONTAINS operator, and wherein the first fixed portion designates a middle portion of a string, and wherein the second wildcard portion designates an ending portion of the string, and wherein the wildcard match includes a third wildcard portion that designates a beginning portion of the string.

4. The method recited in claim 1, wherein the first canonical representation is encoded in Unicode Normalization Form KC (NFKC).

5. The method recited in claim 1, wherein executing the database query includes converting a custom indexed field value from a first canonical encoding to a second canonical encoding.

6. The method recited in claim 5, wherein the first canonical encoding is Unicode Normalization Form KC (NFKC) and wherein the second canonical encoding is Unicode Normalization Form KD (NFKD).

7. The method recited in claim 1, wherein the omitted one or more characters are positioned at the end of the first fixed portion.

8. The method recited in claim 1, wherein the corresponding custom index on the base table column is encoded via Unicode Normalization Form KC (NFKC).

9. The method recited in claim 1, the method further comprising:
determining an efficiency estimate for the first and second query portions, the efficiency estimate indicating whether the first and second query portions are likely to be more computationally efficient than the designated filter criterion.

10. The method recited in claim 1, wherein the first combining character is a diacritical mark.

11. The method recited in claim 1, wherein the first combining character and the second non-combining character together represent a decomposed form of a precomposed character.

12. A computing system:
a processor operable to determine a database query based on a database query definition, the database query including a first query portion and a second query portion, the database query definition including a designated filter criterion that contains a wildcard match, the wildcard match including a first fixed portion and a second wildcard portion, the first query portion including a first canonical representation of the first fixed portion that omits a first combining character, the second query portion including a second canonical representation of the first fixed portion that includes the omitted first combining character, the first combining character modifying a second non-combining character in the first fixed portion;
a database system operable to execute the database query via a database system to select a result set that includes a plurality of query result values, the plurality of query result values selected by applying the second query portion to a base table column to filter values accessed by the first query portion against a corresponding custom index on the base table column, the custom index being maintained by an application external to the database system; and
a communication interface operable to transmit a response message via a network, the response message including the plurality of query result values.

13. The computing system recited in claim 12, wherein the wildcard match is a LIKE operator, and wherein the first fixed portion designates a beginning portion of a string, and wherein the second wildcard portion designates an ending portion of the string.

14. The computing system recited in claim 12, wherein the wildcard match is a CONTAINS operator, and wherein the first fixed portion designates a middle portion of a string, and wherein the second wildcard portion designates an ending portion of the string, and wherein the wildcard match includes a third wildcard portion that designates a beginning portion of the string.

15. The computing system recited in claim 12, wherein the first canonical representation is encoded in Unicode Normalization Form KC (NFKC).

16. The computing system recited in claim 12, wherein executing the database query includes converting a custom indexed field value from a first canonical encoding to a second canonical encoding.

17. The computing system recited in claim 16, wherein the first canonical encoding is Unicode Normalization Form KC (NFKC) and wherein the second canonical encoding is Unicode Normalization Form KD (NFKD).

18. One or more non-transitory computer readable media having instructions stored thereon for performing a method, the method comprising:
determining a database query based on a database query definition via a processor, the database query including a first query portion and a second query portion, the database query definition including a designated filter criterion that contains a wildcard match, the wildcard match including a first fixed portion and a second wildcard portion, the first query portion including a first canonical representation of the first fixed portion that omits a first combining character, the second query portion including a second canonical representation of the first fixed portion that includes the omitted first combining character, the first combining character modifying a second non-combining character in the first fixed portion;
executing the database query via a database system to select a result set that includes a plurality of query result values, the plurality of query result values selected by applying the second query portion to a base table column to filter values accessed by the first query portion against a corresponding custom index on the base table column, the custom index being maintained by an application external to the database system; and
transmitting a response message via a network, the response message including the plurality of query result values.

19. The one or more non-transitory computer readable media system recited in claim 18, wherein the wildcard match is a LIKE operator, and wherein the first fixed portion designates a beginning portion of a string, and wherein the second wildcard portion designates an ending portion of the string.

20. The one or more non-transitory computer readable media system recited in claim 18, wherein the wildcard match is a CONTAINS operator, and wherein the first fixed portion designates a middle portion of a string, and wherein the second wildcard portion designates an ending portion of the string, and wherein the wildcard match includes a third wildcard portion that designates a beginning portion of the string.

\* \* \* \* \*